Jan. 15, 1935.   H. NIELSEN   1,988,391
HEADLIGHT
Filed June 21, 1933   2 Sheets-Sheet 1
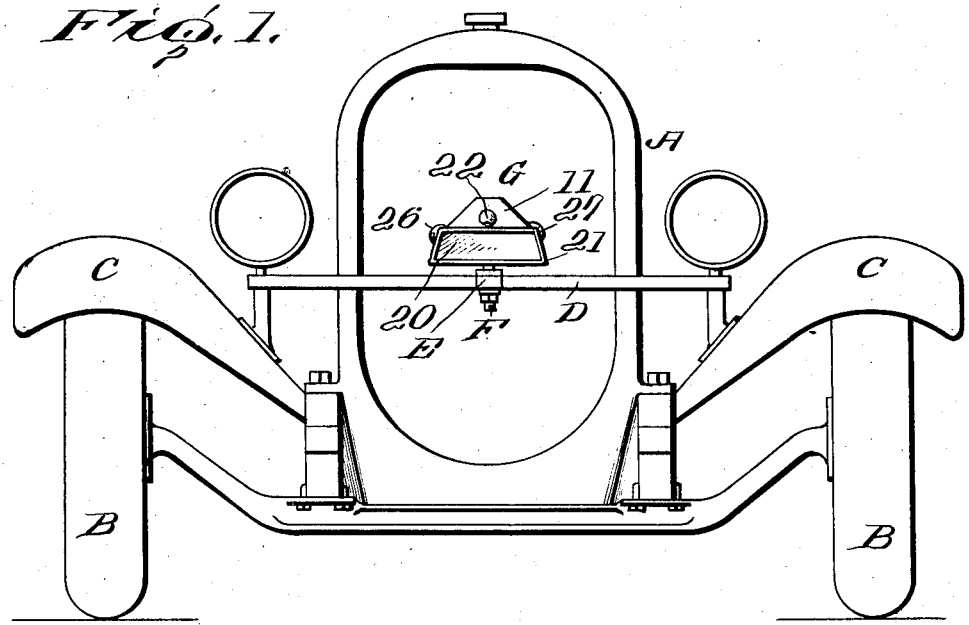
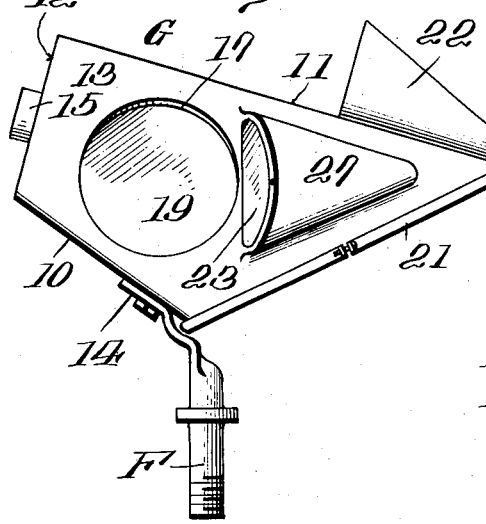
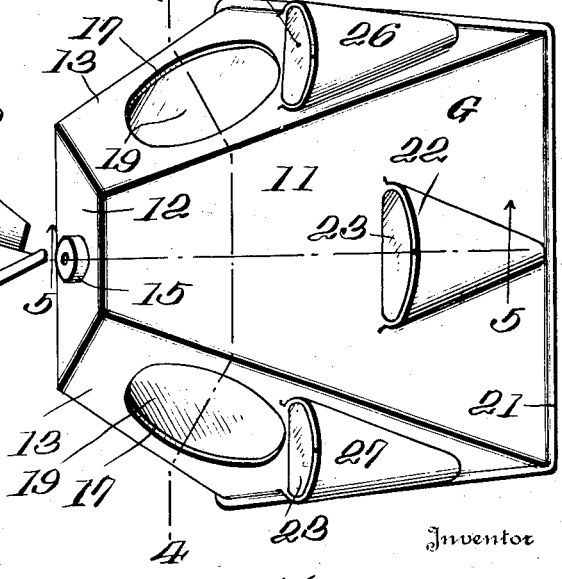
Inventor
Herluf Nielsen
By Wm. S. Hodges
Attorney Jan. 15, 1935.  H. NIELSEN  1,988,391
HEADLIGHT
Filed June 21, 1933    2 Sheets-Sheet 2
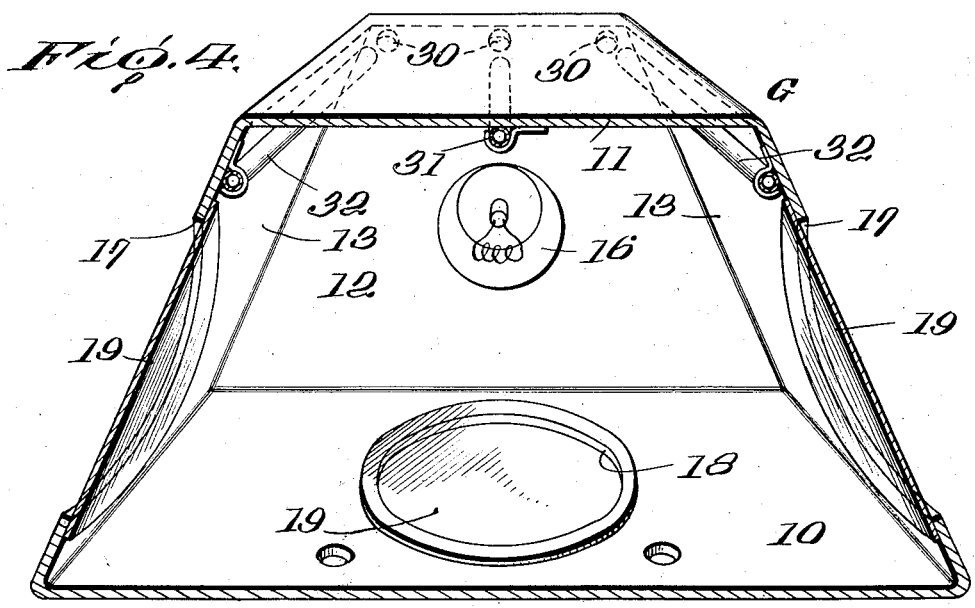
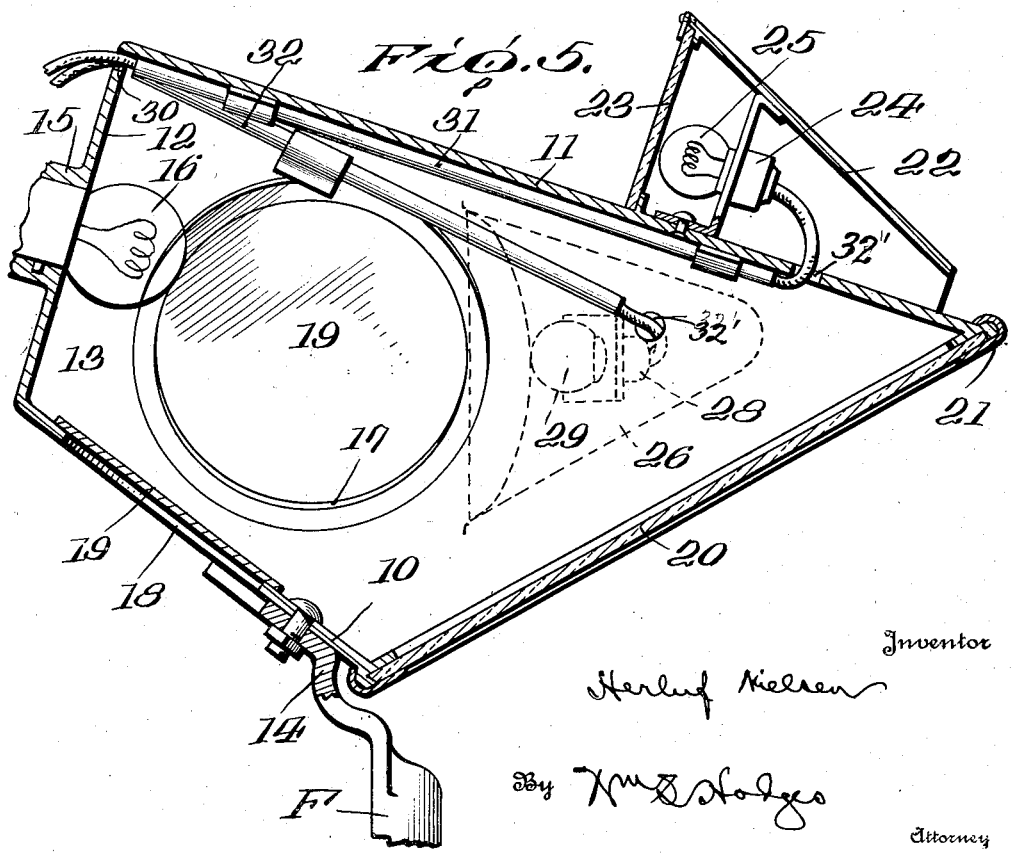

Patented Jan. 15, 1935

1,988,391

UNITED STATES PATENT OFFICE 1,988,391

HEADLIGHT

Herluf Nielsen, New York, N. Y.

Application June 21, 1933, Serial No. 676,937

6 Claims. (Cl. 240—7.1)

This invention is a headlight primarily designed for use on motor vehicles, but not necessarily limited to such use.

One of the objects of the invention is to provide a headlight, so constructed and arranged as to project a forwardly directed beam of light over the roadway, in such manner as to provide adequate illumination, but at the same time prevent the beam from being directed into the eyes of drivers of approaching vehicles. A further object is to provide a headlight of the type mentioned, provided with means for adequately illuminating the sides of the roadway and the ditches along the roadway. A further object is to provide means by which the front of the car, equipped with the headlight may be brilliantly illuminated so as to be readily visible to drivers of approaching cars. A further object is to produce a headlight, so constructed and arranged that a single light may be substituted for and arranged to perform the functions of the two laterally spaced headlights which are now standard equipment on automobiles.

The invention will be hereinafter fully set forth and particularly pointed out in the claims.

In the accompanying drawings:—

Figure 1 is a front elevation conventionally illustrating a portion of an automobile with the invention applied thereto. Figure 2 is a side elevation. Figure 3 is a top plan view. Figure 4 is a transverse section on the line 4—4, Figure 3. Figure 5 is a longitudinal sectional view on the line 5—5, Figure 3.

Referring to the drawings, A designates an automobile which is provided with the usual front wheels B, fenders C, and cross bar D connecting the fenders, all of which is standard equipment. Mounted on said cross bar in suitable manner is a socket member E, in which is removably held the shank F of the headlight lamp G embodying the present invention.

The casing of the lamp consists of a bottom wall 10, a top wall 11, a rear wall 12, and side walls 13. It will be observed that the bottom wall is suitably secured to the shank F, as by means of a bracket 14, said bottom wall being held in a sloping position, i. e. extending rearwardly and upwardly from the shank, with the front edge lower than the rear edge. The back wall extends upwardly from the bottom wall and is joined to the rear end of the top wall. It will also be noted that the bottom wall is wider at the front than at the back, and that the rear edge of the top wall is much narrower than the corresponding edge of the bottom wall, so that the side edges of the rear wall converge upwardly and inwardly. The top wall is much wider at the forward edge than at the rear edge, and is inclined forwardly and downwardly, and of such size as to project well beyond the plane of the forward edge of the bottom wall, the forward edge of the top wall being narrower than the forward edge of the bottom wall. The side walls are of such shape as to join the side edges of the top, bottom and back walls, as will be clearly understood from the drawings. It will also be observed that the top wall is inclined at a slightly different angle from the angle of inclination of the bottom wall, so that said walls diverge in a forward direction, the overhang of the top wall being so arranged as to prevent any portion of the light from being projected into the eyes of the driver of an approaching vehicle.

From the foregoing, it will be understood that the casing has the general effect of an angular box supported in an inclined position, with the forward end lower than the rear end, and with the sides diverging outwardly from the top to the bottom. In other words, the top, bottom and rear walls are of approximately trapezoidal form, the top and bottom walls having their narrowest edges connected with the top and bottom edges of the rear wall, the narrowest edge of the rear wall being at the top. The side walls have three edges joining respectively the top, bottom and rear walls, the front and rear edges of the bottom wall being wider than the corresponding edges of the top wall, the forward edges of the top, bottom and side walls defining an inclined opening of approximate trapezoidal form.

A suitable socket 15 is provided for an electric lamp 16, the same being of suitable construction, said socket being centrally positioned with respect to the rear wall, so that the lamp, which may be of any desired candle power, will project its beam into and beyond the space surrounded by the lamp casing. It will be noted that the forward edge of the top wall is in a horizontal plane below the plane of the lamp socket, so that light projected from the lamp in a horizontal line will be intercepted by said top wall and reflected downwardly in such manner as to thoroughly illuminate the roadway without permitting the light to be projected into the eyes of the driver of an approaching vehicle. Each side wall is provided with an opening 17 and the bottom wall is provided with an opening 18, said openings being so positioned that portions of the beam of light emanating from the lamp 16, may pass laterally through the openings 17 and downwardly through the opening 18. All of said openings are covered by suitable transparent or translucent coverings 19. The front of the lamp casing is closed by a suitable lens 20, held in position by a removable frame 21, of any desired construction.

Mounted on the top wall of the lamp casing is an auxiliary lamp casing 22 open at its rear end, which end is covered with a suitable lens 23. Said auxiliary casing 22 is provided with a socket 24 to receive a lamp 25, as shown. The shape of the casing 22 is immaterial, but for purposes of illustration it is shown of cone-like form.

The side walls of the lamp are also provided with similar auxiliary lamp casings 26 and 27, provided with lamp sockets 28 carrying lamps 29, so positioned as to direct their beams of light rearwardly and slightly laterally. The casings 22, 26 and 27 are so arranged as to prevent the light projected from the lamps 25 and 29 from being directed forwardly into the eyes of approaching drivers.

The various lamps may be connected with a suitable source of current in any desired manner. For purposes of illustration, the rear wall is provided with a plurality of openings 30, communicating with conduits 31 and 32 respectively, supported inside of the casing. The conduit 31 leads to the lamp 25, in the auxiliary casing 22, and the other conduits lead to the lamps located in casings 26 and 27. The top and side walls are provided with suitable openings 32' registering with the outer ends of said conduits for passage of the conductor.

The advantages of the invention will be readily understood by those skilled in the art to which it belongs. An important advantage is that the lamp may be supported midway between the fenders of a motor vehicle, and when so supported the beam of light from the lamp 16 will be projected forwardly and downwardly, in a manner to effectively illuminate the roadway ahead of the machine, and at the same time the beam will be directed in such a manner that it cannot reach the eyes of drivers of approaching vehicles. At the same time, the roadway midway between the wheels is illuminated by a portion of the beam of light passing downwardly through the opening 18 in the bottom wall, and at the same time light is also directed laterally through the openings 17 in the side walls, so as to illuminate space laterally with respect to the course of travel of the vehicle. It will also be observed that the auxiliary lamps are so positioned that they brilliantly illuminate the radiator as well as the fenders of the car, but yet they are so positioned that none of the light projected by these lamps may be directed into the eyes of the driver, because said lamps are positioned well below the top of the radiator and at such positions that the projected beams are interrupted by the radiator and fenders. Another important advantage is that full and effective illumination of the roadway is obtained, without objectionable glare in the eyes of approaching drivers, and restful illumination is provided for the driver of the vehicle equipped with the lamp embodying said invention. Obviously the top lamp may be omitted if desired, without departing from the spirit of the invention.

Having thus explained the nature of the invention and described an operative manner of constructing and using the same, although without attempting to set forth all of the forms in which it may be made, or all of the forms of its use, what is claimed is:—

1. A lamp of the character described comprising a casing consisting of a forwardly and upwardly inclined rear wall of approximately trapezoidal form with its narrowest edge at the top, straight top and bottom walls also of approximately trapezoidal form having their narrowest edges connected with the top and bottom edges respectively of said rear wall, said top and bottom walls extending forwardly and downwardly from the rear wall in diverging relation, and side walls each having three edges joining the top, bottom and rear wall, the front edges of said top and bottom and side walls defining an inclined opening of approximately trapezoidal form with the forward edge of the top wall in a vertical plane in advance of the forward edge of the bottom wall, and lamp supporting means carried by the rear wall, the forward edge of the top wall being in a horizontal plane below the horizontal plane of the lamp supporting means, so as to intercept and downwardly reflect horizontally projected light.

2. A lamp of the character described comprising a casing consisting of a forwardly and upwardly inclined wall of approximately trapezoidal form with its narrowest parallel edge at the top, straight top and bottom walls also of approximately trapezoidal form having the narrowest of their parallel edges connected with the top and bottom edges respectively of said rear wall, the front and rear edges of the bottom wall being wider than the corresponding edges of the top wall, and upwardly and inwardly inclined side walls each having three edges joining the top, bottom and rear walls, the entire casing extending forwardly and downwardly with the top, bottom and side walls in diverging relation, the front edges of the top, bottom and side walls defining an inclined opening of approximately trapezoidal form, the top wall being longer than the bottom wall with its forward edge in a vertical plane in advance of the forward edge of the bottom wall, and lamp supporting means carried by said rear wall, the forward edge of the top wall being in a horizontal plane below the horizontal plane of the lamp supporting means, so as to intercept and downwardly reflect horizontally projected light.

3. A lamp of the character described comprising a casing having a forwardly and upwardly inclined rear wall provided with lamp supporting means, top and bottom walls connected with said rear wall and extended forwardly and downwardly therefrom in diverging relation, the top wall being longer than the bottom wall, with its forward edge in a vertical plane in advance of the forward edge of the bottom wall, and with its forward edge in a horizontal plane below the horizontal plane of the lamp supporting means, so as to intercept and downwardly reflect horizontally projected light, said bottom wall being wider at its front and rear ends than the top wall at the corresponding ends, upwardly and inwardly sloping side walls connecting the top, bottom and rear walls, said side walls having openings therein, and flaring auxiliary lamp casings carried by the side walls, the said auxiliary casings being placed at positions located forwardly relative to said openings, but with their larger ends at the rear and adjacent a side opening.

4. A lamp of the character described comprising a casing having a forwardly and upwardly inclined rear wall provided with lamp supporting means, top and bottom walls connected with said rear wall and extended forwardly and downwardly therefrom in diverging relation, the top wall being longer than the bottom wall, with its forward edge in a vertical plane in advance of the forward edge of the bottom wall, and with its forward edge in a horizontal plane below the horizontal plane of the lamp supporting means, so as to intercept and downwardly reflect horizontally projected light, side walls connecting said top, bottom and rear walls, and a flaring auxiliary lamp casing carried by the top wall adjacent the forward edge thereof, the larger end of said auxiliary casing being at the rear so that light emanating therein will be projected rearwardly along the top of the lamp casing.

5. A lamp of the character described comprising a casing having a forwardly and upwardly inclined rear wall provided with lamp supporting means, top and bottom walls connected with said rear wall and extended forwardly and downwardly therefrom in diverging relation, the top wall being longer than the bottom wall, with its forward edge in a vertical plane in advance of the forward edge of the bottom wall, and with its forward edge in a horizontal plane below the horizontal plane of the lamp supporting means, so as to intercept and downwardly reflect horizontally projected light, the bottom wall being wider at both ends than the top wall, upwardly and inwardly sloping side walls connecting said top, bottom and rear walls, and conical lamp casings supported by said side walls and having their larger ends at the rear so as to project light emanating within said auxiliary lamp casings rearwardly along said sides.

6. A lamp of the character described comprising a casing having a forwardly and upwardly inclined rear wall provided with lamp supporting means, top and bottom walls connected with said rear wall and extended forwardly and downwardly therefrom in diverging relation, the top wall being longer than the bottom wall, with its forward edge in a vertical plane in advance of the forward edge of the bottom wall, and with its forward edge in a horizontal plane below the horizontal plane of the lamp supporting means, so as to intercept and downwardly reflect horizontally projected light, said bottom wall being wider at both ends than the top wall, and upwardly and outwardly sloping end walls connecting the rear wall, the bottom wall and the top wall, a flaring lamp casing secured to the exterior of the top wall adjacent the forward edge thereof, other flaring auxiliary lamp casings carried by the exteriors of the side walls, all of said auxiliary casings having their larger ends located at the rear so as to project light rearwardly along the main lamp casing, tubular conduits carried by the inner surfaces of said sides, and a similar tubular conduit secured to the interior of the top wall, said conduits being constructed and arranged to conduct electrical energy to lamps in the respective auxiliary casings.

HERLUF NIELSEN.